United States Patent [19]

Weisman

[11] 4,439,548

[45] Mar. 27, 1984

[54] MODIFIED POLYURETHANE PRODUCT HAVING IMPROVED LOAD-BEARING CHARACTERISTICS

[76] Inventor: Morey Weisman, 147-23 Charter Rd., Jamaica, N.Y. 11435

[21] Appl. No.: 414,884

[22] Filed: Sep. 3, 1982

Related U.S. Application Data

[63] Continuation-in-part of Ser. No. 248,228, Mar. 27, 1981, Pat. No. 4,348,489, which is a continuation of Ser. No. 329,754, Feb. 3, 1973, abandoned.

[51] Int. Cl.$^3$ ............................................. C08G 18/14
[52] U.S. Cl. .................................. 521/130; 521/132; 521/137
[58] Field of Search ....................... 521/130, 132, 137

[56] References Cited

U.S. PATENT DOCUMENTS

| | | | |
|---|---|---|---|
| 2,764,565 | 9/1956 | Hoppe et al. | 521/172 |
| 2,834,748 | 5/1958 | Bailey et al. | 528/29 |
| 3,061,460 | 10/1962 | Schickendanz | 521/54 |
| 3,072,582 | 1/1963 | Frost | 521/114 |
| 3,244,571 | 4/1966 | Weisman | 428/160 |
| 3,393,119 | 7/1968 | Dugan | 428/246 |
| 3,535,197 | 10/1970 | Fishbein et al. | 428/311.1 |
| 3,574,149 | 4/1971 | Harrington | 521/137 |
| 3,585,062 | 6/1971 | Hand et al. | 428/317.9 |
| 4,111,865 | 9/1978 | Seefried et al. | 521/137 |
| 4,223,098 | 9/1980 | Treadwell | 521/116 |

*Primary Examiner*—Maurice J. Welsh
*Attorney, Agent, or Firm*—Michael Ebert

[57] ABSTRACT

A modified low-density flexible polyurethane foam product having a relatively high degree of firmness as well as commercially acceptable dielectric heat sealing characteristics. The product formulation includes an intermediate constituted by a mixture of polyol and a polymer/polyol in a ratio imparting to the product a predetermined degree of firmness, and a thermoplastic additive whose dielectric loss index is greater than the loss index of polyurethane foam to impart to the product an acceptable dielectric heating response in a high frequency electric field. This response is enhanced by a styrene component included in the polymer/polyol.

8 Claims, No Drawings

MODIFIED POLYURETHANE PRODUCT HAVING IMPROVED LOAD-BEARING CHARACTERISTICS

RELATED APPLICATION

This application is a continuation-in-part of my copending application Ser. No. 248,228, filed Mar. 27, 1981, now U.S. Pat. No. 4,348,489 issued on Sept. 7, 1982. This copending application is a continuation of an original application Ser. No. 329,754, filed Feb. 3, 1973 (now abandoned). The entire disclosure of this copending application is incorporated herein by reference.

BACKGROUND OF THE INVENTION

This invention relates generally to polyurethane foam plastic material, and more particularly to a modified polyurethane foam capable of being embossed, welded, tear sealed, bar sealed, sealed and cut or otherwise processed by high-frequency dielectric heating techniques.

In dielectric heating, the material being treated is pressed between electrodes across which is imposed a high-frequency voltage in the range of 2–200 megahertz, to electrically stress the dielectric and thereby generate heat internally. For dielectric embossing, the surface of one of the electrodes is contoured so as to impart a predetermined design to the material engaged thereby.

It has not heretofore been feasible to dielectrically process ordinary polyurethane foam using standard dielectric heating equipment. Since the primary concern of the present invention is to alter the dielectric characteristics of polyurethane foam so that it is responsive to a high-frequency field of the type generated by standard dielectric heating equipment, a brief outline of the principles underlying the use of such equipment is in order.

When an electrically non-conductive or insulating material is subjected to a high-frequency field, the electrically charged molecules in the material tend to change position or oscillate in response to the high-frequency alternating voltage. The resultant agitation of the molecules gives rise to internal friction and heat. This internal heat is sufficient with some plastic materials to reduce the plastic to a near liquid or softened state that can result in a weld or tear when pressure is simultaneously imposed on the material by the dielectric heating electrodes.

The two properties of a dielectric material that determine how well it will retain energy in the form of heat when stressed by a high-frequency field are the dielectric constant and the power factor of the material. The dielectric constant of a material is the measure of retained energy due to molecular deformation, or the ratio of the capacitance of a material in a given electrical configuration with a vacuum as the dielectric. The power factor is the amount of leakage current that will pass through the insulating material to produce a heat loss.

The product of the dielectric constant and the power factor of a given material determine its loss factor or loss index. When an alternating voltage is applied to the dielectric, a current called the displacement current flows through it, causing energy to be stored in the dielectric. In an ideal dielectric, all of the displacement current is stored, so that an ideal dielectric makes a perfect capacitor. An ideal resistor, on the other hand, will convert all of the current passing through into heat and no charge is stored.

Synthetic plastic materials are usually classified as dielectrics but not all such materials lend themselves to dielectric heating. This capability is determined by the loss index of the plastic material which in some instances is so low as to result in virtually no internal heat when the material is exposed to a high-frequency field.

It has been demonstrated that when the loss index is 0.2 and greater, the heating response of a dielectric material in an electric field of the type established by standard high-frequency dielectric heating equipment is satisfactory or good, but when the loss index lies in a range from 0.08 to 0.2, the response is only fair.

Below this range as the loss index diminishes, the response becomes increasingly poor. Thus, in the loss index range of 0.01 to 0.08, the response is quite poor, while in the range of 0.01 or less the response runs from extremely poor to negligible.

Thus, the loss index of a dielectric material is indicative of its ability to be heated by a high-frequency electric field. With the above-described response scale in mind, we can now consider, for purposes of comparison, typical loss index values for a variety of familiar materials.

| Typical Loss Index Values | | |
| --- | --- | --- |
| Material | Loss Index | Response |
| ABS polymer | 0.025 | poor |
| epoxy resins | 0.12 | fair |
| polyester | 0.05 | poor |
| polyvinyl chloride (PVC) | 0.4 | good |
| water | 0.4 | good |
| polyurethane foam (typical "one shot" polyether) | 0.00055 | extremely poor |

In the case of polyurethane foam, the sample from which the above loss index value was derived, had a dielectric constant of 1.1 and a power factor of 0.0005. Since the loss index is the dielectric constant multiplied by the power factor, the loss index of polyurethane is $1.1 \times 0.0005$ which equals 0.00055.

Because the loss index of PVC affords a good response to high-frequency dielectric heating voltages, it is widely used in the fabrication of such products as embossed automotive upholstery in which a trim material of vinyl sheeting is placed over a flexible vinyl foam plastic pad having a fabric or fiberboard backing. Upon operation of the dielectric heating press, an embossed pattern is produced in the laminated article, in which the vinyl trim material is fused to the backing through the foam plastic vinyl pad, the plastic in the pad having been melted and cured along the embossing lines.

The flexible foam pad in the embossed article provides cushioning and shock-absorbing qualities. One can, by this technique, produce seat covers, floor mats and wall panels of various kinds, and many other cushioned and embossed products having an attractive trim. In the commercial manufacture of articles of the type wherein the heat-seal seam joining the laminations also completely defines the contour of the article, it is also possible to so construct the shaped electrode as to form along the heat-seal lines, a tear-line permitting ready stripping of the waste material from the completed article. This does away with the need for a subsequent cutting operation and leaves a well-defined edge on the article.

In articles of the foregoing type, use has generally been made of PVC foam for the padding and PVC sheeting for the trim, for such combinations of vinyl foam and vinyl sheeting or film have very similar or matching dielectric characteristics which facilitate dielectric heating. However, despite the advantages of urethane, it has not been feasible to make these articles of ordinary polyurethane foam or polyurethane foam combined with a dissimilar material such as vinyl film, woven nylon fabrics and other thermoplastic materials capable of being dielectrically heated.

Among the advantages of polyurethane foam over vinyl and other commercially-available forms of foam plastics, are that polyurethane foam has markedly superior thermal and acoustical insulating properties as well as a more uniform cell structure. Moreover, not only is polyurethane foam much lighter than vinyl foam, a significant factor in handling and transportation costs, but it is a far more economical material.

Attempts have heretofore made to alter the dielectric characteristics of polyurethane foam so as to impart thereto a loss factor which lends itself to dielectric heating techniques. One approach is that set forth in the Schickendanz U.S. Pat. No. 3,061,460 which involves the post impregnation of urethane foam of the ester or ether type with a vinyl plastic to so alter the dielectric properties of the foam as to render it dielectrically heatable.

Another approach is that disclosed in applicant's prior U.S. Pat. No. 3,244,571 in which the polyurethane foam is modified by the introduction of vinyl resin. This is accomplished by including vinyl particles in the foam-forming reaction mixture. In this way, the vinyl is diffused during the foaming process throughout the fibrous structure of the foam without filling the cells thereof, so that the structure of the foam retains its normal cushioning and acoustic insulating properties that would otherwise be degraded had the cells been impregnated. Other examples of post-impregnation may be found in the Dugan U.S. Pat. No. 3,393,119, the Fishbein U.S. Pat. No. 3,535,197 and the Hand U.S. Pat. No. 3,585,062.

The present invention is concerned with improving the physical and dielectric characteristics of pre-treated polyurethane foam of the ester or ether type incorporating an additive such as PVC which is included in the urethane-foam forming reaction mixture to modify the dielectric properties of the resultant foam material so as to render it responsive to dielectric heating. The expression, "modified polyurethane foam," will hereinafter be used to designate this type of foam material to distinguish it from foam whose properties are altered by post impregnation.

The difficulty experienced with modified polyurethane foam is that the introduction of the additive in the foaming process is such as to create holes in the final product. The existence of such holes militates against the commercial acceptability of the modified polyurethane.

When a polyvinyl additive in particulate form is intermingled with the liquid polyurethane foam-forming reaction mixture, the particles are later softened and liquified as a result of the exothermic reaction which takes place when the liquid foaming reaction mixture is laid down and foamed. But with PVC additives of the type heretofore used, the gell point of the PVC was close to the temperature of the exothermic reaction (about 300° F.); hence the additive was slow to soften during foaming or failed to soften. The exothermic temperature depends on the nature of the mixture and, in practice, goes as low as 270° F. and as high as 330° F.

Also because the viscosity of the liquified polyvinyl of the type heretofore used as an additive was distinctly greater than the viscosity of the urethane, extrusion of the softened additive was retarded and the polyvinyl was not adequately distributed throughout the structure of the polyurethane foam body.

Moreover, because the sizes and shapes of the PVC particles heretofore employed as an additive were such as to impair the flowability of the polyurethane-foam-forming mixture into which the particles were introduced and to render the mixture sluggish, it became difficult to pump the mixture. As a result, air was entrapped in the mixture, creating air pockets or holes in the final foam product.

In my above-identified copending application, there is disclosed a modified polyurethane foam plastic material free of holes and other defects and having the advantageous physical properties of ordinary polyurethane foam but a loss factor substantially greater than ordinary foam whereby the modified foam may be processed by dielectric heating techniques. This product is produced by intermingling with a polyurethane foam-forming reaction mixture particles of polyvinyl chloride (PVC) which are in spherical form, the PVC being of a type having a low molecular weight affording a low order of viscosity and a gell or softening point which is distinctly below the temperature level of the exothermic reaction which thereafter takes places when the foam-forming reaction mixture containing the particles is laid down and foamed.

Many practical applications exist for a modified polyurethane foam product of low-density having some degree of firmness and good load bearing characteristics. A product having such properties is useful, for example, in automobile seat cushions, upholstery and bedding. This combination of characteristics cannot be obtained when the foam is derived from a standard polyol intermediate; for to achieve firmness, the foam must then be of a high density. The resultant weight of the high density product is objectionable in many applications, to say nothing of costs which go up substantially with an increased density.

One can produce relatively low cost, low-density polyurethane foam using a polymer/polyol intermediate in the formulation to obtain a very firm product having excellent load bearing characteristics. Polymer/polyol intermediates suitable for this purpose are disclosed in the Seefried, Jr. et al. U.S. Pat. No. 4,111,865 (Sept. 5, 1978). These compositions are made by the in situ polymerization of a vinyl polymeric base, to give a dispersion of the vinyl polymeric portion in the liquid polymer. Polymer/polyols are characterized by the presence of polymer-to-polyol grafted species.

Polyurethane foam products made from the polymer/polyol compositions disclosed in the Seefried, Jr. et al. patent are less susceptible to static fatigue, so that when the load imposed thereon is lifted, the foam returns to its original unloaded state and does not remain deformed.

The degree of firmness of a flexible polyurethane foam product is defined by its indentation load deflection properties (ILD). Thus when the ILD is in the range of 18 to 24, it is classified as soft; when the ILD is in the 24 to 30 range, it is medium soft; whereas the 30 to 36 range affords medium firm properties; the 36 to 46 range, firm properties, the ILD's above 46 being very firm. Foams made with polymer/polyol intermediates fall into the firm and very firm ranges and are not suitable for those applications which require less firm and medium soft ILD's of low density foam.

While a foam product of the type disclosed in my copending application has acceptable dielectric heating characteristics which are highly useful for lamination and other treatments, it cannot be made in a low density firm composition.

SUMMARY OF INVENTION

In view of the foregoing, the main object of this invention is to provide a modified polyurethane foam material having acceptable dielectric heat sealing characteristics and a predetermined degree of firmness which for a given density is greater than that obtainable in a foam derived entirely from a polyol intermediate and is less than that derived entirely from a polymer/polyol intermediate.

Also an object of this invention is to provide modified polyurethane foam which has enhanced dielectric sealing characteristics, the foam formulation including a thermoplastic additive whose dielectric loss index is greater than that of polyurethane foam, the polymer/polyol intermediate including a component also having a greater dielectric loss index.

While a modified flexible foam polyurethane product in accordance with the invention is dielectrically heat sealable, the same product can be laminated, embossed or otherwise processed by other forms of heat treatment, such as thermoforming, flame bonding or ultrasonic welding.

Briefly stated, these objects are attained in a modified low-density flexible polyurethane foam product having a relatively high degree of firmness as well as commercially acceptable dielectric heat sealing characteristics. The product formulation includes an intermediate constituted by a mixture of polyol and a polymer/polyol in a ratio imparting to the product a predetermined degree of firmness, and a thermoplastic additive whose dielectric loss index is greater than the loss index of polyurethane foam to impart to the product an acceptable dielectric heating response in a high frequency electric field. This response is enhanced by a styrene component included in the polymer/polyol.

DESCRIPTION OF INVENTION

The Basic Production Technique

In modifying a polyurethane foam to render it responsive to dielectric heating, any known formulation for producing ordinary polyurethane foam may be used, such as the formulation set forth in my U.S. Pat. No. 3,499,848 or in the other patents cited hereinabove. The basic process will first be described using a standard polyol intermediate. The basic process for making homogeneous polyurethane foam of elastic consistency are disclosed in U.S. Pat. No. 2,764,565 issued Sept. 25, 1956. Many polyurethane flexible foams are based on diethylene glycoladipic acid polyesters.

In the preparation of the polyurethane foam-forming reaction mixture for use in this invention, either the so-called "one-shot method" may be used or one may use the two-step process known as the semi-prepolymeter or quasi-prepolymer technique. Any combination of polyether, polyols, organic polyisocyanates, foaming agent, catalyst and other reactants capable of forming a flexible or semi-flexible polyurethane foam can be employed in carrying out the invention. The term foam-forming reaction mixture in the specification and claims herein is meant to include any such combination of ingredients. Typical formulations are described in U.S. Pat. No. 3,072,582, issued Jan. 8, 1963 and U.S. Pat. No. 3,679,718, issued July 9, 1972.

To further illustrate suitable formulations, the polyether polyols, useful for the preparation of the polyurethane material include oxyalkylated polyhydric alcohols having a molecular weight in the range between about 200 and and about 10,000 and preferably between about 1,000 and 8,000. The hydroxyl number of the polyether polyol is generally less than about 750 and preferably in the range between about 20 and about 175. These osyalkylated polyhydric alcohols are generally prepared by reacting, in the presence of an alkaline catalyst, a polyhydric alcohol and an alkylene oxide such as ethylene oxide, propylene oxide, butylene oxide, amylene oxide, epichlorohydrin, and mixtures of these alkylene oxides, by either random addition or step-wise addition, as is well-known in the art. If desired, a portion of the polyether polyols may be replaced with another compound having at least two reactive hydrogen atoms, such as a diol, an alkyl amine, and alkylene polyamine, a cyclic amine, an amide, or a polycarboxylic acid.

In a preferred embodiment of the invention, a polyol blend is employed comprising a polyether triol, having a molecular weight range of about 1,000–8,000 and a hydroxyl number range of about 20–175, and a diol having a molecular weight range of about 60–3,000 and a hydroxyl number range of about 50–200. The weight ratio of polyether triol to diol, according to this preferred embodiment, can range from about 1:8 to about 6:8.

The organic polyisocyanates used in the preparation of the polyurethane foam-forming reaction mixture include toluene diisocyanate, ethylene diisocyanate, propylene diisocyanate, methylene-bis (4-phenylisocyanate), 3,3'-bitoluene-4,4'-diisocyanate, hexamethylene diisocyanate, naphthalene-1,5-diisocyanate, polyphenylene polymethylene polyisocyanate, mixtures thereof and the like. The amount of polyisocyanate employed in the process should be sufficient to provide at least about 0.7 NCO group per reactive hydrogen present in the total reaction system. An excess of isocyanate compound may be conveniently employed; however, this is generally undesirable due to the high cost of the isocyanate compounds. It is preferable, therefore, to employ sufficient polyisocyanate to provide no greater than about 1.25, and preferably between about 0.9 and about 1.15, NCO groups per reactive hydrogen.

The polyurethane foam-forming reaction mixture also contains a foaming agent, a reaction catalyst, and preferably a small proportion of a conventional surfactant. The foaming agent employed may be any of those known to be useful for this purpose, such as water, as well as organic foaming agents containing up to about seven carbon atoms such as the halogenated hydrocarbons, lower molecular weight alkanes, alkenes, ethers and mixtures thereof. Typical halogenated hydrocarbons include, but are not limited to, monofluorotrichloromethane, dichlorofluoromethane, difluorodichloromethane, 1,1,2-trichloro-1,2,2,-trifluoroethane, dichlorotetrafluoroethane, ethyl chloride, methylene chloride, chloroform, and carbon tetrachloride. Other useful foaming agents include lower molecular weight alkanes, alkenes and ethers such as methane, ethane, ethylene, propane, propylene, pentane, hexane, heptane, ethyl ether, diisopropyl ether, mixtures thereof, and the like. It is preferred, however, to use water, either alone or in combination with an organic foaming agent.

The amount of foaming agent employed may be varied within a wide range. Generally, however, the halogenated hydrocarbons are employed in an amount from about 1 to 50 parts by weight per 100 parts by weight of the polyol, and water is generally employed in an amount from about 1.0 to 6.0 parts by weight per 100 parts by weight of the polyol.

The polyurethane foam-forming reaction mixture further contains a catalytic amount of a reaction catalyst. The catalyst employed may be any of the catalysts known to be useful for this purpose, or mixtures thereof, including tertiary amines and metallic salts, particularly stannous salts. Typical tertiary amines include, but are not limited to, the following: N-methyl morpholine, N-hydroxyethyl morpholine, triethylene diamine, triethylamine and trimethylamine. Typical metallic salts include, for example, the salts of antimony, tin and iron, e.g., dibutyltin dilaurate, stannous octoate, and the like. Any catalytic proportion of catalysts may be employed. Preferably, a mixture of amine and metallic salt is employed as the catalyst. The catalyst or catalyst mixture, as the case may be, is usually employed in an amount ranging between about 0.05 and about 1.5, and preferably between about 0.075 and about 0.50 percent by weight of the polyol.

It is preferred in the preparation of the polyurethane foam-forming reaction mixture to employ minor amounts of a conventional surfactant in order to further improve the cell structure of the polyurethane foam. Typical of such surfactants are the silicone oils and soaps, and the siloxane-oxyalkylene block copolymers. U.S. Pat. No. 2,834,748 and T. H. Ferrigno, Rigid Plastic Foams (New York: Reinhold Publishing Corp., 1963), pp. 38–42, disclose various surfactants which are useful for this purpose. Generally up to 2 parts by weight of the surfactant are employed per 100 parts of the polyol.

Various additives may also be employed which serve to impart different properties to the resulting foam, e.g., fillers such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants and anti-oxidants may also be included in the foam-forming composition. The urethane foam may be rendered fire-retardant by the inclusion of antimony oxide and other ingredients in the PVC additive, as disclosed in U.S. Pat. No. 3,574,149 or by the inclusion of aluminum hydrate (Alcoa HYDRAL #705 and #710). Unlike inert fillers, hydrated alumina stands up to fire by giving off water vapor as heat is absorbed—to extend the flash point and snuff the flame. Moreover, HYDRAL is a good vinyl resin stabilizer, particularly with regard to heat stability and volume resistivity. Also because water is highly polar, it enhances the dielectric heat sealability of the product along the line of seal.

In accordance with the present invention, introduced into a mixing or reaction zone containing the urethane foam-forming mixture is an additive, preferably in the form of polyvinyl chloride resin particles. The particles fed into the mixture are thoroughly intermingled and are dispersed throughout the mixture by suitable mixing blades or similar expedients. In practice, one may use additives whose dielectric characteristics are similar to PVC, such as polyvinyl acetate which may be substituted for or blended with PVC.

It is important that the additive have the following characteristics:

A. A gell point that is lower than the temperature level of the exothermic reaction which takes place when the foam-forming reaction mixture is laid down for foaming and curing (The gell point or gelling point, as it is sometimes called, is the temperature at which a semi-liquid becomes solid. It is a function of the concentration as well as the temperature of the substance. Hence, when solid PVC particles are heated above their gell point, they become semi-liquid).

B. A specific viscosity of about 0.30 (Viscosity is the resistance to flow exhibited by the additive in the liquid state and bears an inverse relationship to mobility).

The lower the molecular weight of the PVC additive, the lower its viscosity and the lower its gell point. Because the gell point of the particles is below the exothermic reaction temperature (i.e., 300° F. and higher) when the foam-forming mixture containing the particles is laid down in a mold or on a conveyor belt and proceeds to foam and expand, the PVC particles are subjected to a displacement force as well as to heat. The large PVC particles are softened by the heat and because the viscosity of the molten PVC is low, extrusion takes place as the foaming urethane mass expands to draw streams or tentacles of PVC from the particles which interlace the entire cellular structure of the urethane to produce a three-dimensional skeletal network therein.

Among the commercial types of PVC resin particles which are suitable for this purpose are MARVINOL (trade mark) vinyls, types 15 and 19 produced by Uniroyal Chemical, a division of Uniroyal, Inc. of Naugatuck, Conn. Marvinol type 15 has an inherent viscosity of 0.74, a specific viscosity of 0.30, a gell temperature of 275°–300° F. and a heat loss of 0.2%. The particle size is: 20% retained on a USS 270 mesh screen. Marvinol type 19 has an inherent viscosity of 0.84, a specific viscosity of 0.34, a gell temperature of 275°–300° F., and a heat loss of 0.2%. The particle size is 20% retained on a USS 277 mesh screen.

It has been found that a further reduction in the gell point of the additive may be effected by blending with the PVC particles a small amount (3 to 20% by weight) of polyvinyl acetate. Another suitable additive for this purpose is poly methyl methacrylate. The additive, therefore, in order to be effective must be a thermoplastic material which is highly polar and has a good response to a high-frequency field, and also one whose gell point is below the temperature of the exothermic reaction of the foam-forming mixture, with a low order of viscosity, so as to form a skeletal network within the foam.

The particle size and particle shape of the additive come into play in the preparation of the polyurethane foam-forming reaction mixture. It has been found that when the particle shape is spherical and the particles are relatively large (80% retained on a 200 mesh screen), then the particles, when introduced into the urethane foam-forming mixture have a minimal effect on the flowability of the mixture and do not interfere with the pumping and further treatment thereof. It has been found that when the particles are relatively small and irregular in shape, then when they are introduced into the mixture, the mixture is rendered sludge-like in character and is difficult to pump. But with large spherical particles, then they are readily dispersed in the mixture and do not impair the normal flowability of the mixture and the entrainment of air therein is minimized. In this way, the ultimate foam product is free of air pockets or holes.

The movement of the additive particles, as a result of the displacement force produced by the expanding foam, and the rapid softening thereof, resulting from the heat generated by the exothermic reaction, transpire concurrently so that as the particles are displaced, they are at the same time rendered molten and extruded into tentacles of fibres which interlace the cellular structure of the foam material to form a polyvinyl skeleton or three-dimensional network therein.

An example of a suitable polyvinyl chloride additive whose particle shape is generally spherical and whose size is relatively large is MARVINOL No. 24 (Gell. temp. 275°-300° F.—specific viscosity 0.30—particle size: 80% retained on 200 mesh).

Because the loss index of the PVC additive affords a good response when the additive is subjected to a high-frequency heating field, whereas the loss index of pure urethane foam gives rise to a poor response, by interlacing the PVC throughout the cellular structure of the urethane to create a skeletal network therein, the overall loss index of the modified urethane foam is such as to provide an acceptable response. The relative amount of PVC which is added to the urethane foam is determined by the end use of the product and may be proportioned or tailored to meet specific requirements. It is to be understood that the invention is not limited to PVC but encompasses other thermoplastic additives having a good high-frequency response, a gell point below the exothermic temperature level of the polyurethane mixture, and a relatively low viscosity.

As pointed out previously, polyvinyl acetate (PVA) or poly methyl methacrylate (PMM) may be blended with a polyvinyl (PVC) resin additive or they may be used alone. Thus, in practice, an additive may be a blend of PVC—20 parts by weight (pbw) and PVA—15 pbw relative to 100 parts of polyol or a blend of PVC—20 pbw and PMM—15 pbw. Or one may use PVA alone—35 pbw or PMM alone—35 pbw.

Preferred Formulations

In the previous section, a basic process is described in accordance with the invention making use of a polyol intermediate and a PVC or other additive to produce a modified flexible polyurethane having acceptable dielectric heat sealing characteristics.

In the above-identified Seefried, Jr. et al. patent, whose entire disclosure is incorporated herein by reference, there is described a process making use of polymer/polyol intermediates for producing a flexible polyurethane foam having improved load bearing characteristics. But because no use is made of PVC or other additives to modify the dielectric for loss index of the product, this product lacks acceptable dielectric heat sealing characteristics.

The preferred formulation for the present invention uses as an intermediate a mixture of polyol of the type in current use to make conventional low density polyurethane foam products and a polymer/polyol in a ratio such as 50/50 (parts by weight) imparting to the low-density product a desired degree of firmness (ILD). The greater the relative amount of polyol to polymer/polyol, the less firm the product; and the greater the relative amount of polymer/polyol to polyol, the firmer the product.

Polymer/polyols are commercially available in a variety of polyols, molecular weights and polyol reactivities. Thus, in NIAX Polymer/Polyols marketed by Union Carbide Corporation, NIAX 31-45, the base polyol has a molecular weight of 3000 plus 20% acrylonitrile by weight, but no styrene; whereas NIAX 34-37 has a base polyol molecular weight of 3600, with 9% acrylonitrile by weight and 90% styrene by weight.

We have found that when the graft content of the polymer polymer/polyol is high in acrylonitrile and/or styrene, that these components, which have a dielectric loss index which is greater than that of ordinary polyurethan foam, act to further enhance the dielectric heat sealing characteristics imparted thereto to the foam by the PVC additive. As a consequence, the resultant product not only makes possible a low-density, yet firm polyurethane product, but one whose dielectric heat sealing properties are superior to modified polyurethane foam products made according to my copending application.

In practice, the formulation may include a non-amine blowing catalyst as disclosed in the Treadwell U.S. Pat. No. 4,223,098 (1980) assigned to M & T Chemicals, Inc., this company manufacturing such catalysts (CNF-712/752).

As pointed out in the Treadwell patent, a low-density flexible polyurethane foam can be prepared using water and relatively large amounts of methylene chloride as the foaming agents in the presence of organic or inorganic tin compounds as the gel catalyst consisting essentially of catalytically effective amounts of antimony carboxylate, a potassium carboxylate and a zinc carboxylate.

A non-amine catalyst in the foam formulation prevents discoloration of the polyurethane product, which discoloration is encountered when using an amine catalyst in the presence of a PVC additive. Also, in practice, a fire retardant such as Stauffer Chemicals' FYROL-EFF may be included in the formulation.

To make a modified polyurethane product having a 2 lb. density in accordance with the invention, the following formulation was used:

| Ingredient | | Parts Per Weight on 100 Parts Intermediate |
|---|---|---|
| A. | Intermediate: 50-50 Mixture of Polyol and NIAX Polymer/Polyol | 100.00 |
| B. | Additive: PVC (Tenneco #195) | 70.00 |
| C. | Surfactant: Silicone L-5740 | 1.3 |
| D. | Tin Catalyst: T-9 | .30 |
| E. | Water | 3.70 |
| F. | Blowing Catalyst: M&J-CNF 712/752 | .30 |
| G. | Fire retardant: Stauffer's FYROL-EFF | 7.00 |
| H. | Methylene chloride | 6.00 |
| I. | T.D.I. (blowing agent) | 45.44 |
| | Total | 234.04 |
| | Gas loss - Actual | 15.03 |
| | - % | 6.42% |
| | Yield | 219.01 lbs. |

While there has been shown and described a preferred embodiment of modified polyurethane products having improved load-bearing characteristics in accordance with the invention, it will be appreciated that many changes and modifications may be made therein without, however, departing from the essential spirit thereof.

Thus to further enhance the dielectric heat sealing or heat treatment characteristics of an open cell foam product in accordance with the invention, the cellular surface thereof may be saturated with thermoplastic powders, PVC, polyethylene, polypropylene or similar particulate material. This can best be accomplished by means of a jet blower such as the JETZONE machine manufactured by WOLVERINE CORPORATION of Methuen, Mass. The powders are fed into a pressurized stream of air projected at high velocity from the machine and directed onto the surface of the foam product. The powders are fluidized in the stream and caused to impinge at high velocity onto the cellular surface, as a result of which the powders impregnate the cells at the surface. A powder-saturated surface of this type facilitates lamination of a foam plastic layer by heat and pressure to a substrate such as a fabric liner.

I claim:

1. A modified flexible polyurethane foam product of low density derived from a formulation including an intermediate constituted by a mixture of a first polyol of a type adapted to yield a low density foam, and a polymer/polyol produced by polymerization of at least one monomer component in a second polyol in a ratio imparting to the product a predetermined degree of firmness which is greater than that obtainable in a foam derived entirely from the first polyol intermediate and is less than that obtainable in a foam derived entirely from a polymer/polyol intermediate, and a thermoplastic additive whose dielectric loss index is greater than that of a polyurethane foam; the additive being in a relative amount imparting to the modified product a loss index approaching that of polyvinyl chloride to produce an acceptable dielectric heating response in a high-frequency electric field.

2. A product as set forth in claim 1, wherein said additive is polyvinyl chloride.

3. A product as set forth in claim 1, wherein said polymer/polyol includes a component which enhances the dielectric heating response.

4. A product as set forth in claim 3, wherein said component is styrene.

5. A product as set forth in claim 3, wherein said component is acrylonitrile.

6. A product as set forth in claim 1, wherein said ratio is about 50:50.

7. A product as set forth in claim 1, further including a non-amine blowing catalyst.

8. A product as set forth in claim 1, wherein said formulation further includes a fire-retarding agent.

* * * * *